H. E. FOUCHER.
BICYCLE LOCK.
APPLICATION FILED MAR. 8, 1912.
1,057,587.
Patented Apr. 1, 1913.
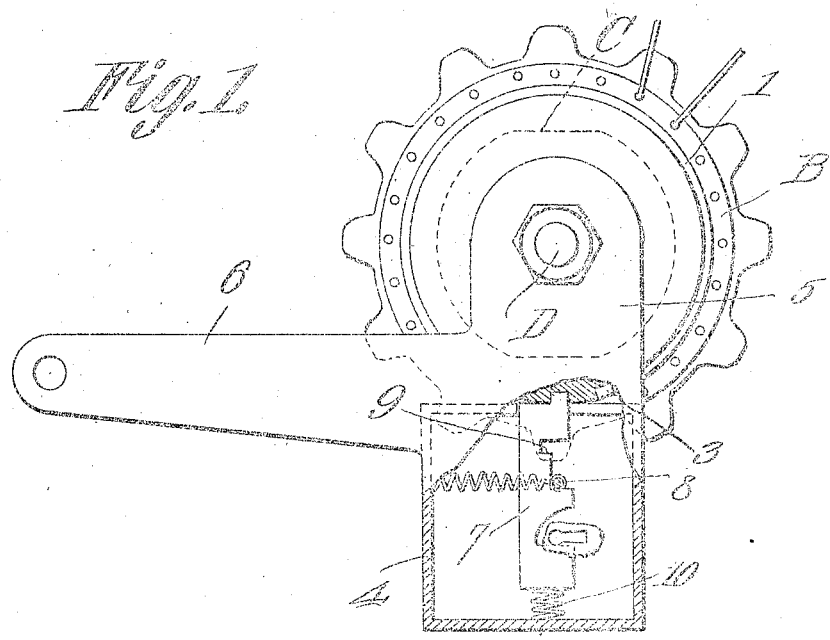
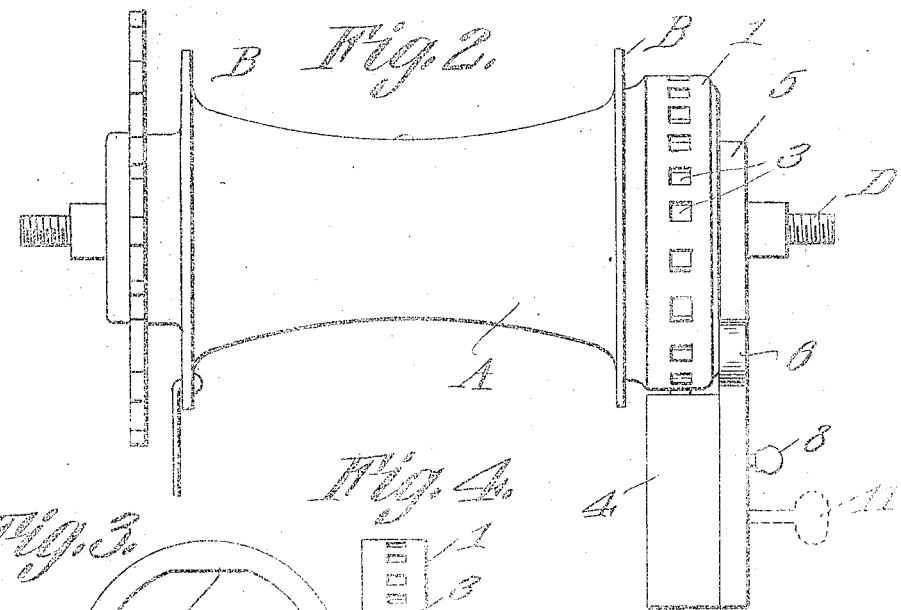
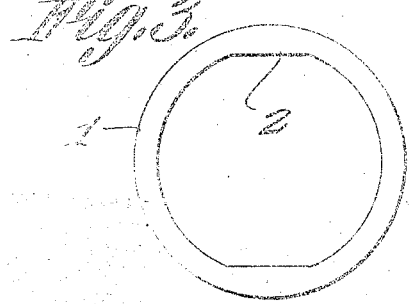
H. E. Foucher
Inventor
Attorneys

UNITED STATES PATENT OFFICE.

HARRY E. FOUCHER, OF AUGUSTA, GEORGIA.

BICYCLE-LOCK.

1,057,537.

Specification of Letters Patent.  Patented Apr. 1, 1913.

Application filed March 8, 1912. Serial No. 682,443.

*To all whom it may concern:*

Be it known that I, HARRY E. FOUCHER, a citizen of the United States, residing at Augusta, in the county of Richmond and State of Georgia, have invented a new and useful Bicycle-Lock, of which the following is a specification.

This invention relates to bicycle locks, its object being to provide a compact device of this character designed to coöperate with the hub of the rear wheel so as to hold said wheel against rotation.

Another object is to provide a lock which constitutes a fixed part of the bicycle and which will not detract from the appearance thereof.

A further object is to provide a lock which is cheap to manufacture and which can be used either as an attachment for a bicycle already constructed or which can be built onto the machine.

With the foregoing and other objects in view which will appear as the description proceeds, the invention resides in the combination and arrangement of parts and in the details of construction hereinafter described and claimed, it being understood that changes in the precise embodiment of the invention herein disclosed can be made without departing from the spirit of the invention.

In the accompanying drawings the preferred form of the invention has been shown.

In said drawings:—Figure 1 is a side elevation of the lock applied to the rear hub of a bicycle, a portion of the lock casing being broken away. Fig. 2 is a front elevation of the parts shown in Fig. 1. Fig. 3 is a side elevation of the hub engaging ring of the lock. Fig. 4 is an edge view of said ring.

Referring to the figures by characters of reference A designates the hub of a bicycle wheel and where this hub projects laterally beyond the spoke engaging flange B, it is provided with one or more flat faces C. A ring, such as shown at 1, is adapted to be placed on this projecting portion of the hub and has its inner edge formed with straight portions 2 adapted to fit upon the flattened portions C of the hub. Thus it will be seen that the ring cannot rotate independently of the hub after it has once been placed in position thereon. A series of slots or recesses 3 is formed in the periphery of the ring 1, the recesses of the series being located any desired distances apart. A lock casing 4 is supported under the ring 1 by an arm 5 which is bolted or otherwise secured to the axle D on which the hub A is mounted. Another arm 6 extends from the lock casing 4 and is adapted to be bolted or otherwise secured to the frame of the vehicle. Thus it will be seen that the lock casing is held fixedly against movement relative to the frame. The lock casing carries a spring pressed bolt 7 one end of which is normally projected against the ring 1 so as to become seated within any one of the recesses 3 which may be brought into register therewith. A spring drawn pin 8 is slidably mounted within the casing 4 and is adapted, when the bolt is retracted into the casing 4 to engage a shoulder 9 on said bolt and thus hold said bolt in retracted position and with its spring 10 under compression.

When it is desired to lock the hub against rotation, the pin 8 is pushed relative to casing 4 in any suitable manner so as to become disengaged from the shoulder 9. Spring 10 promptly forces the bolt 7 longitudinally so as to throw it against the ring 1 whereby it will become seated within the first recess 3 brought into register therewith. After the bolt has thus been projected it becomes impossible to rotate the hub B because it is securely locked to the fixed casing 4. In order to release the hub it is necessary to insert a key into the casing 4 and to rotate it so as to retract the bolt 7. During this retraction the shoulder 9 will be brought into position where it will be automatically engaged by the pin 8 and the said bolt will thus be held retracted until the pin is again pushed out of normal position whereupon the action hereinbefore described will be repeated. In the drawings the key has been indicated at 11.

Importance is attached to the fact that the lock constituting the present invention is very compact in form and can be readily applied to bicycles already constructed. If preferred, however, instead of providing a ring 1 which is separate from the hub, recesses such as shown at 3, may be formed in the hub of the wheel and the lock casing 4 can be made an integral part of the vehicle frame. This arrangement of parts is so obvious that it is not deemed necessary to illustrate it in detail.

Where an ordinary coaster brake is used in connection with the wheel, the lock casing 4 can be formed on the arm of the coaster brake which corresponds with the arm 6 herein described. It is to be understood that the lock can be applied to the hub of the front wheel of the vehicle by attaching arm 6 to one of the arms of the front fork. If deemed necessary any suitable means may be employed for preventing the pin or knob 8 from becoming accidentally dislodged while the bicycle is in use.

What is claimed is:—

1. The combination with the hub of a wheel, said hub having a flat face, of a bicycle lock including a ring detachably engaging the hub and having a straight inner edge adapted to bear upon said flattened face to hold the ring against rotation on the hub, said ring having an annular series of keepers in its periphery, a lock casing, means for attaching the casing to the frame of a vehicle, a locking bolt, means for holding the bolt retracted in the casing, and means for automatically projecting the bolt into engagement with one of the keepers when the bolt is released.

2. A lock attachment for the hubs of bicycle wheels and the like, including a ring for engaging a hub and having a straight inner surface, said ring having a plurality of recesses in its periphery, a lock casing, separate means extending therefrom for engaging the axle and frame respectively of a bicycle, a locking bolt normally projecting from the casing and into engagement with the recessed ring, a foot actuated pin extending from and through the casing for holding the bolt retracted out of engagement with the ring, said pin constituting means when shifted by means of the foot, for releasing the bolt to permit it to be projected into engagement with the ring; and yielding means for holding the pin normally in bolt engaging position.

In testimony that I claim the foregoing as my own, I have hereto affixed my signature in the presence of two witnesses.

HARRY E. FOUCHER.

Witnesses:
O. L. JOHNSTON,
HENRY F. SAXON.